United States Patent
Vanderheyden

(10) Patent No.: US 9,802,577 B2
(45) Date of Patent: Oct. 31, 2017

(54) WIPER BLADE FOR CLEANING PANES IN PARTICULAR OF MOTOR VEHICLES

(75) Inventor: Gert Vanderheyden, Tildonk (BE)

(73) Assignee: Robert Bosch GmbH, Stuttgart (DE)

( * ) Notice: Subject to any disclaimer, the term of this patent is extended or adjusted under 35 U.S.C. 154(b) by 566 days.

(21) Appl. No.: 14/001,546

(22) PCT Filed: Feb. 16, 2012

(86) PCT No.: PCT/EP2012/052700
§ 371 (c)(1),
(2), (4) Date: Aug. 26, 2013

(87) PCT Pub. No.: WO2012/113708
PCT Pub. Date: Aug. 30, 2012

(65) Prior Publication Data
US 2013/0326836 A1    Dec. 12, 2013

(30) Foreign Application Priority Data

Feb. 24, 2011  (DE) .................. 10 2011 004 637

(51) Int. Cl.
*B60S 1/40*  (2006.01)
*B60S 1/38*  (2006.01)

(52) U.S. Cl.
CPC .............. *B60S 1/40* (2013.01); *B60S 1/3856* (2013.01); *B60S 1/3879* (2013.01); *B60S 1/3896* (2013.01); *B60S 2001/3898* (2013.01); *Y10T 29/49826* (2015.01)

(58) Field of Classification Search
CPC ..... B60S 1/3881; B60S 1/3879; B60S 1/3877
USPC ........................ 15/250.43, 250.451, 250.32
See application file for complete search history.

(56) References Cited

U.S. PATENT DOCUMENTS

| 3,116,507 A * | 1/1964 | Scinta ................... B60S 1/3801 |
| | | 15/250.14 |
| 6,449,797 B1 * | 9/2002 | De Block ............. B60S 1/3808 |
| | | 15/250.201 |
| 6,634,055 B1 | 10/2003 | De Block |
| 6,675,432 B1 | 1/2004 | De Block |
| 2006/0107485 A1 | 5/2006 | Kim |

(Continued)

FOREIGN PATENT DOCUMENTS

| CN | 1197432 | 10/1998 |
| CN | 101312862 | 11/2008 |

(Continued)

OTHER PUBLICATIONS

International Search Report for Application No. PCT/EP2012/052700 dated Jul. 13, 2012 (2 pages).

*Primary Examiner* — Andrew A Horton
(74) *Attorney, Agent, or Firm* — Michael Best & Friedrich LLP

(57) ABSTRACT

The invention relates to a production method and to a wiper blade for wiping panes, in particular motor vehicle panes, comprising a retaining element (12) for receiving a wiper strip (14), said retaining element having two spring rails (28, 30) which are separated from each other by a gap (32) and to which a connecting device (20) is fixed. The connecting device has a wiper blade-side part (15) with claw-like receiving portions (34, 36) that engage around the retaining element (12) at least in some regions. Each of the receiving portions (34, 36) has an internal width (42) that expands in the direction of the gap (32).

12 Claims, 5 Drawing Sheets

(56) References Cited

U.S. PATENT DOCUMENTS

2008/0289133 A1* 11/2008 Kim .................. B60S 1/387
                                                          15/250.32
2010/0275403 A1* 11/2010 Jollec ................. B60S 1/38
                                                          15/250.361

FOREIGN PATENT DOCUMENTS

| | | | |
|---|---|---|---|
| DE | 102006031514 A1 * | 1/2008 | ............. B60S 1/386 |
| EP | 0914269 | 12/2002 | |
| EP | 2177407 | 4/2010 | |
| KR | 100681006 | 2/2007 | |
| KR | CA 2744775 A1 * | 6/2010 | ............ B60S 1/3879 |
| WO | 9850261 | 11/1998 | |
| WO | 02087935 | 11/2002 | |
| WO | 2010016000 | 2/2010 | |

* cited by examiner

WIPER BLADE FOR CLEANING PANES IN PARTICULAR OF MOTOR VEHICLES

BACKGROUND OF THE INVENTION

In the case of wiper blades for wiping windows, in particular motor vehicle windows, comprising a supporting element for receiving a wiper strip which supporting element has two spring rails which are separated from one another via a gap and to which a connection device is fastened, which connection device has a wiper blade-side part with claw-like receptacles which engage around the supporting element at least in certain regions, the supporting element is supposed to ensure as uniform as possible distribution of the wiper blade contact pressure emanating from the wiper arm against the window over the entire wiping area wiped by the wiper blade. By means of an appropriate curvature of the supporting element when under no load—i.e. when the wiper blade is not resting against the window—the ends of the wiper strip, which is laid fully on the window during the operation of the wiper blade, are subjected to a load in the direction of the window by the supporting element, which is then stressed, even though the radii of curvature of spherically curved vehicle windows differ at each wiper blade position. The curvature of the wiper blade must therefore be somewhat greater than the greatest curvature measured in the wiping area at the window to be wiped. A connection device, by means of which the connection with the wiper arm is established, is fastened to the supporting element.

EP 0914269 B1 has disclosed the practice of fastening the connection device to the supporting element by means of a welded joint. For this purpose, the wiper blade-side connection element, which is made of either metal or plastic, is applied to or pushed onto the supporting element and connects it materially to the supporting element by means of a resistance weld in the case of a metal connecting element or by means of an ultrasonic weld in the case of a plastic connecting element. In everyday use, this welded joint is exposed to extreme conditions and must withstand high torques and vibrations in different weather conditions. Especially in the case of wiper blades which are produced in large numbers, a welded joint makes high quality demands on process management and thus makes a wiper blade more expensive, which is precisely what needs to be avoided in the case of mass-produced goods.

SUMMARY OF THE INVENTION

The wiper blade according to the invention has the advantage that simple assembly is made possible by expanding the inner widths in the direction of the gap. The spring rails can be connected reliably and cost-effectively to the wiper blade-side parts of the connection device.

By means of a bevel on one side or a spherical profile at least on one side of the inner widths, the spring rails are automatically centered when inserted into the inner widths. Moreover, the wiper blade-side part can be produced as an injection molding without problem.

If the bevel or the spherical profile is arranged on a concave side of the spring rails, whereas the inner surfaces of the inner widths arranged on the convex side of the spring rails are aligned with one another, it is ensured that, after assembly and during later use of the wiper blade, the pressing force exerted by the wiper arm on the connection device can be transmitted flat onto the spring rails. As a result, torques which load the connection can be avoided.

A secure and fixed clamping connection results when the size of the inner widths in the groove bases opposite the gap are the same size or somewhat smaller than the thickness of the spring rails. It is ensured in this way that the spring rails are firmly clamped in the inner widths.

The connection device can be simply pushed onto the spring rails when the receptacles are provided with run-on bevels.

A very simple and reliable method in which welded joints are effectively avoided is provided by the method according to the invention for producing a wiper blade whereby the spring rails are inserted individually or together into the receptacles and, after reaching the predetermined longitudinal position of the wiper blade-side part of the connection device, the spring rails are pressed into the groove bases of the inner widths to create the gap.

DETAILED DESCRIPTION

Figure 1:
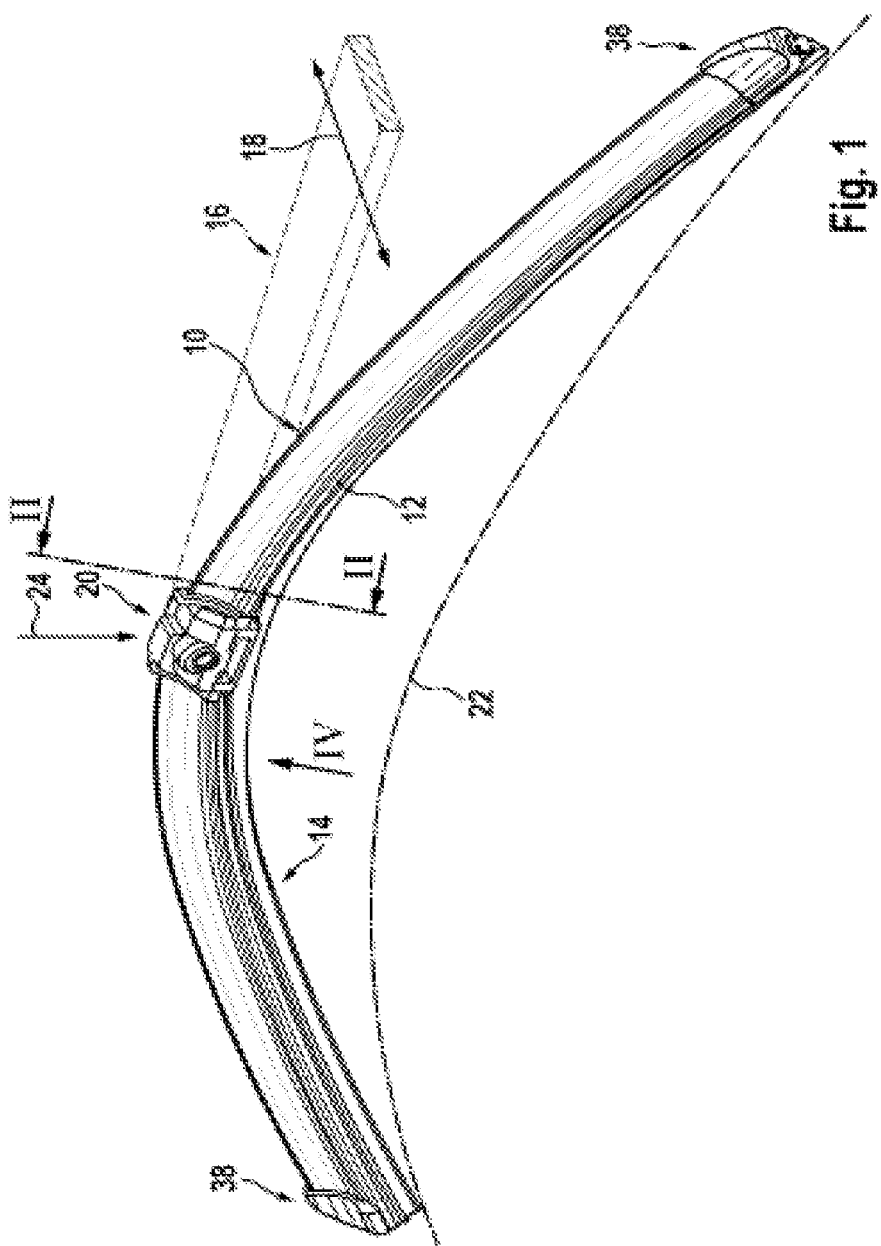
FIG. 1 shows a wiper blade according to the invention in perspective representation with a wiper arm indicated in chain-dotted lines and a windshield surface indicated in chain-dotted lines.

A wiper blade 10 shown in FIG. 1 has a supporting element 12 (FIGS. 1 and 2), which is elongated in the manner of a band, which has spring elasticity and on the lower band side 13 of which, that facing the window, an elongated wiper strip 14 having rubber elasticity is fastened parallel to the longitudinal axis. Arranged on the upper band side 11, that facing away from the window, of the supporting element 12, which can also be referred to as a spring rail, in the central section of said supporting element, is the wiper blade-side part 15 of a connection device, by means of which the wiper blade 10 can be releasably connected in an articulated manner to a wiper arm 16 indicated in chain-dotted lines in FIG. 1. The wiper arm 16, which is driven backward and forward in the direction of a double arrow 18 in FIG. 1, is loaded in the direction of an arrow 24 toward the window to be wiped—for example toward the windshield of a motor vehicle—the surface of which is indicated in FIG. 1 by a chain-dotted line 22. Since the line 22 is intended to represent the greatest curvature of the window surface, it is clearly apparent that the curvature of the wiper blade resting by the two ends thereof against the window is greater while under no load than the maximum window curvature (FIG. 1). Under the contact pressure (arrow 24) the wiper blade 10 comes to rest over its entire length, by means of its wiping lip 26, against the window surface 22. At the same time, a stress builds up in the supporting element 12 which is made of metal and has spring elasticity, said stress ensuring proper contact between the wiper strip 14 or the wiping lip 26 and the window surface 22 over the entire length of said strip or lip and ensuring uniform distribution of the contact pressure (arrow 24).

The particular embodiment of the wiper blade according to the invention will be explained in greater detail below.

Figure 2:
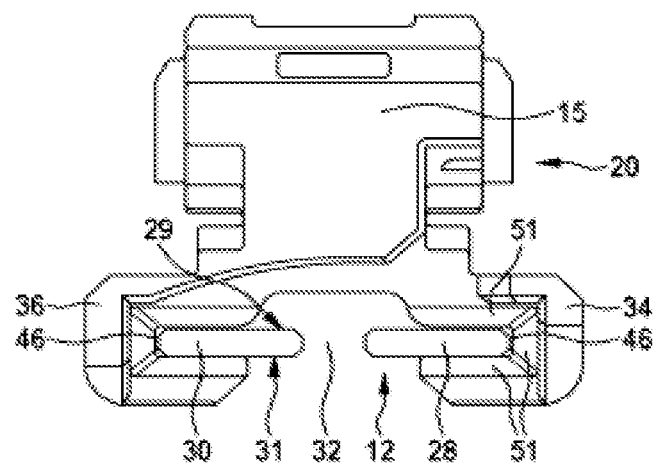
FIG. 2 shows a view according to II-II in FIG. 1.

In FIG. 2, it can be seen that the supporting element 12 is constructed from two mutually separate spring rails 28 and 30, which are spaced apart and form the basis of a gap 32. In a lower region, the connection device 15 has two u-shaped receptacles 34 and 36, in which the spring rails 28 and 30 are received. The receptacles 34 and 36 surround each of the spring rails 28 and 30 over a relatively large proportion of the cross section thereof, wherein that part of the connection device 15 which corresponds to the wiper arm 16 is arranged on the convex side 29 of the supporting element 12, while the concave side 31 lies opposite said convex side.

Figure 3:
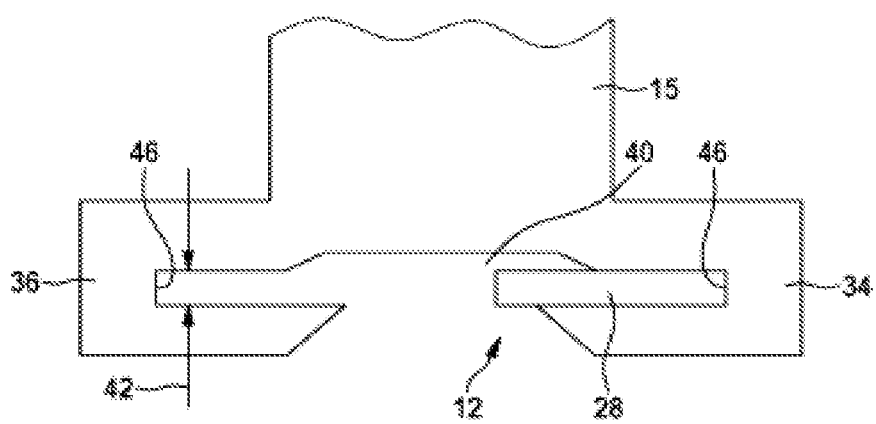
FIG. 3 shows a schematic representation of the view shown in FIG. 2 with just one spring rail.

In FIG. 3, the connection device 15 is illustrated schematically, wherein the corresponding spring rail 28 is depicted in the receptacle 34, while the spring rail 30 is not in the corresponding receptacle 36. It can be seen that the receptacles 34 and 36 fit around the spring rails 28 and 30. In the region above the spring rails 28 and 30 and above the gap 32, the connection device 15 has a recess 40, in which a head part of a wiper strip comes to rest when the wiper blade 10 is assembled.

Figure 4:
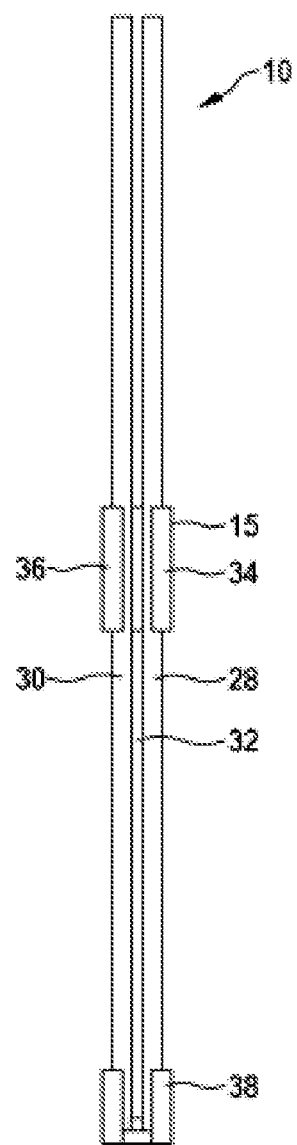
FIG. 4 shows a schematic view in the direction of view IV in FIG. 1 with just one end cap.

The wiper blade 10, which is shown from below in FIG. 4 and is depicted without the wiper strip 14 or wiper lip 26, shows the spring rails 28 and 30, the gap 32 and the receptacles 34 and 36 of the connection device 15. It can be seen that, in this embodiment of the wiper blade 10, the spring rails 28 and 30 are completely separated from one another and are only held together by the connection device 15 or by means of end caps 38, of which only one is depicted at one end in FIG. 4.

Figure 5:
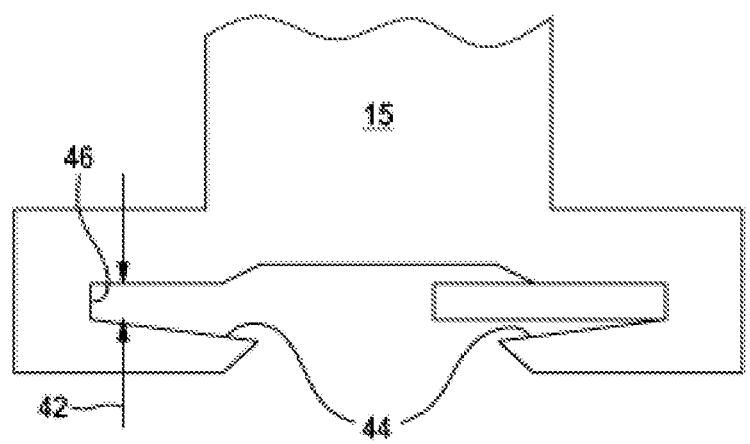
FIGS. 5 to 8 show exemplary embodiments of wiper blade-side parts of the connection device with a different design of the inner widths.

In FIG. 5, a wiper blade-side part of a connection device 20 is illustrated analogously to FIG. 3. It can be seen that the receptacles 34, 36 have a bevel 44. The bevels widen the inner widths 42 from a groove base 46 in the direction of the gap 32 between the spring rails 28, 30. If the spring rails 28, 30 are inserted into the inner width 42, they can thus slide along the bevel 44 up to the groove bases 46.

Figure 6:
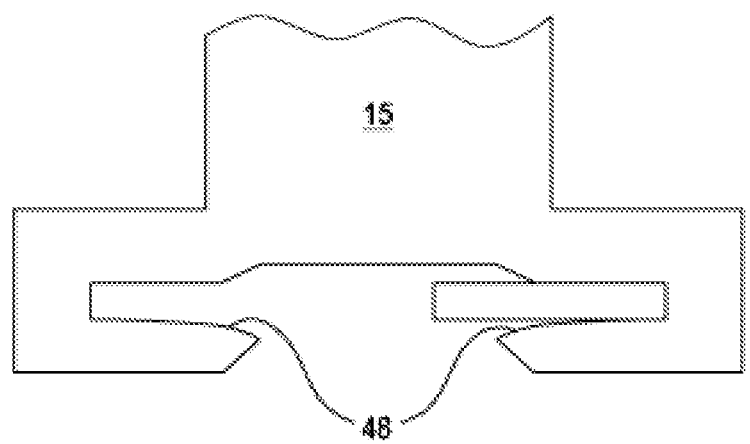

In FIG. 6, the bevel 48 is arranged analogously to the bevel 44 of FIG. 5. However the bevel 48 is of spherical design. In the region of the groove base 46, the spring rails 28, 30 are clamped over a relatively large region; nevertheless, the opening when pushing the spring rails 28, 30 into the inner width 42 allows simple centering. The same is made possible by the step-shaped bevel 50 shown in FIG. 7.

Figure 7:
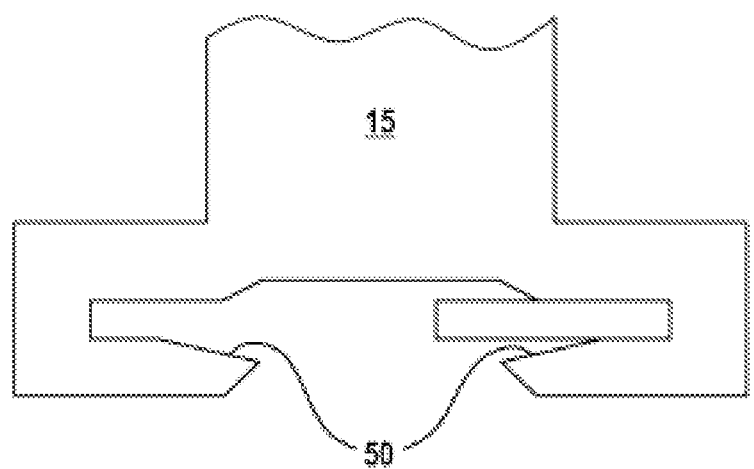
Figure 8:
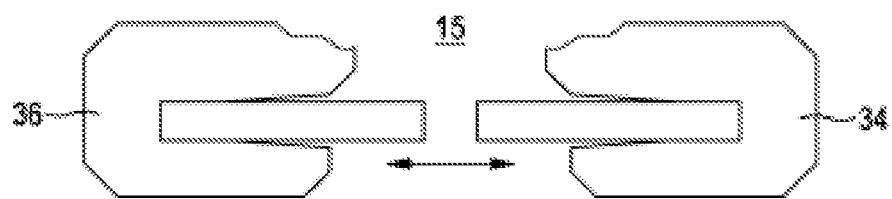

Common to the exemplary embodiments according to FIGS. 5 to 7 is the fact that the sides of the wiper blade-side part 15 which rest on the upper side of the spring rails 28, 30, that is to say the convex side of the curved spring rails 28, 30, are aligned with one another. No bevel is thus arranged in this region. In this way, the wiper blade-side part 15 can transmit the pressing force applied by the spring arm 16 flat onto the spring rails 28, 30. In the variant shown in FIG. 8, bevels in 52 are also arranged in this region.

It can be seen that the inner width 42 in the region of the groove bases 46 must approximately correspond to the thickness of the spring rails 28, 30 or is rather somewhat smaller. In this way, a clamping connection can be achieved. The bevels 44, 48, 50 form the basis of an opening angle between 1° and 15° or are 0.5 mm to 1.5 mm larger at their expanded side than in the region of the groove base 46.

The wiper blade-side part 15 has, on its outer sides, run-on bevels 51 which make it possible for the wiper blade-side part to be pushed simply onto the spring rails 28, 30.

In the method according to the invention for producing a wiper blade 10, the spring rails 28, 30 are inserted together into the receptacles 34, 36 or the connection device is pushed onto the spring rails, wherein the spring rails 28, 30 bear against one another more or less without a gap. It is only when the longest position of the connection device 20 relative to the spring rails 28, 30 has been reached that the spring rails 28, 30 are completely inserted into the inner widths 42 of the receptacles 34, 36, with the result that the gap 32 is formed.

If the inner widths 42 have at least one beveled side, this considerably simplifies the sliding operation. Run-on bevels 51 simplify the threading of the spring rails 28, 30 into the wiper blade-side part 15.

What is claimed is:

1. A wiper blade for wiping windows, comprising a supporting element (12) receiving a wiper strip (14), which supporting element has two spring rails (28, 30) which are separated from one another via a gap (32) and to which a connection device (20) is fastened in a central section of the supporting element, the connection device (20) directly, pivotally coupled to a wiper arm (16), which connection device has a wiper blade-side part (15) with claw-like receptacles (34, 36) which engage around the supporting element (12) at least in certain regions, characterized in that the receptacles (34, 36) each have an inner width (42) which expands in a direction toward the gap (32), wherein each of the spring rails (28, 30) includes a top surface and an oppositely-facing bottom surface, wherein the bottom surface extends entirely from a first vertical edge to a second vertical edge of the spring rail (28, 30) and faces toward the wiper strip (14), wherein each of the receptacles (34, 36) contacts a greater portion of the bottom surface than the top surface, wherein the receptacles (34, 36) include lower portions that extend laterally inwardly toward one another, the lower portions each including an upper surface and a lower surface, wherein the upper surfaces contact the bottom surfaces of the spring rails (28, 30), and wherein the upper surfaces are spaced laterally apart from one another a distance that is smaller than a lateral distance between the lower surfaces, wherein the wiper blade extends along a longitudinal direction of elongation, and the spring rails (28, 30) each extend out of opposite ends of the connection device (20) along the longitudinal direction of elongation, and wherein the lower surface is planar and extends from an outermost edge of the lower portion to an innermost edge of the lower portion, the innermost edge being inclined at an oblique angle relative to the planar lower surface.

2. The wiper blade as claimed in claim 1, characterized in that the inner widths (42) of the receptacles (34, 36) have at least on one side a bevel for producing the expansion.

3. The wiper blade as claimed in claim 2, characterized in that the bevel is situated on a concave side of the spring rails (28, 30), whereas mutually facing inner surfaces of the inner widths (42) are aligned with one another on a convex side of the spring rails (28, 30).

4. The wiper blade as claimed in claim 3, characterized in that the size of the inner widths (42) in groove bases opposite the gap (32) are the same size or somewhat smaller than a thickness of the spring rails (28, 30), with the result that the inserted spring rails (28, 30) are firmly clamped.

5. The wiper blade as claimed in claim 4, characterized in that the receptacles (34, 36) have run-on bevels.

6. The wiper blade as claimed in claim 1, characterized in that the size of the inner widths (42) in groove bases opposite the gap (32) are the same size or somewhat smaller than a thickness of the spring rails (28, 30), with the result that the inserted spring rails (28, 30) are firmly clamped.

7. The wiper blade as claimed in claim 1, characterized in that the receptacles (34, 36) have run-on bevels.

8. The wiper blade as claimed in claim 1, further comprising a wiper arm (16) directly pivotally coupled to the connection device (20).

9. The wiper blade as claimed in claim 1, wherein the central section has a length along the longitudinal direction of elongation that is less than half of an overall length of the wiper blade device along the longitudinal direction of elongation.

10. The wiper blade as claimed in claim 1, wherein the outermost edge of the lower portion is a vertical, planar edge, wherein the innermost edge of the lower portion is a planar edge, and wherein the innermost edge extends at an oblique angle to the outermost edge.

11. A wiper blade for wiping windows, comprising a supporting element (12) receiving a wiper strip (14), which supporting element has two spring rails (28, 30) which are separated from one another via a gap (32) and to which a connection device (20) is fastened in a central section of the supporting element, the connection device (20) directly, pivotally coupled to a wiper arm (16), which connection device has a wiper blade-side part (15) with claw-like receptacles (34, 36) which engage around the supporting element (12) at least in certain regions, characterized in that the receptacles (34, 36) each have an inner width (42) which expands in a direction toward the gap (32), wherein each of the spring rails (28, 30) includes a top surface and an oppositely-facing bottom surface, wherein the bottom surface extends entirely from a first vertical edge to a second vertical edge of the spring rail (28, 30) and faces toward the wiper strip (14), wherein each of the receptacles (34, 36) contacts a greater portion of the bottom surface than the top surface, wherein the wiper blade extends along a longitudinal direction of elongation, and the spring rails (28, 30) each extend out of opposite ends of the connection device (20) along the longitudinal direction of elongation, and wherein each of the receptacles (34, 36) contacts a majority of the bottom surface of the spring rail (28, 30), wherein the receptacles (34, 36) include lower portions that extend laterally inwardly toward one another, the lower portions each including an upper surface and a lower surface, wherein the upper surfaces contact the bottom surfaces of the spring rails (28, 30).

12. The wiper blade as claimed in claim 11, wherein the upper surfaces are spaced laterally apart from one another a distance that is smaller than a lateral distance between the lower surfaces.

\* \* \* \* \*